UNITED STATES PATENT OFFICE.

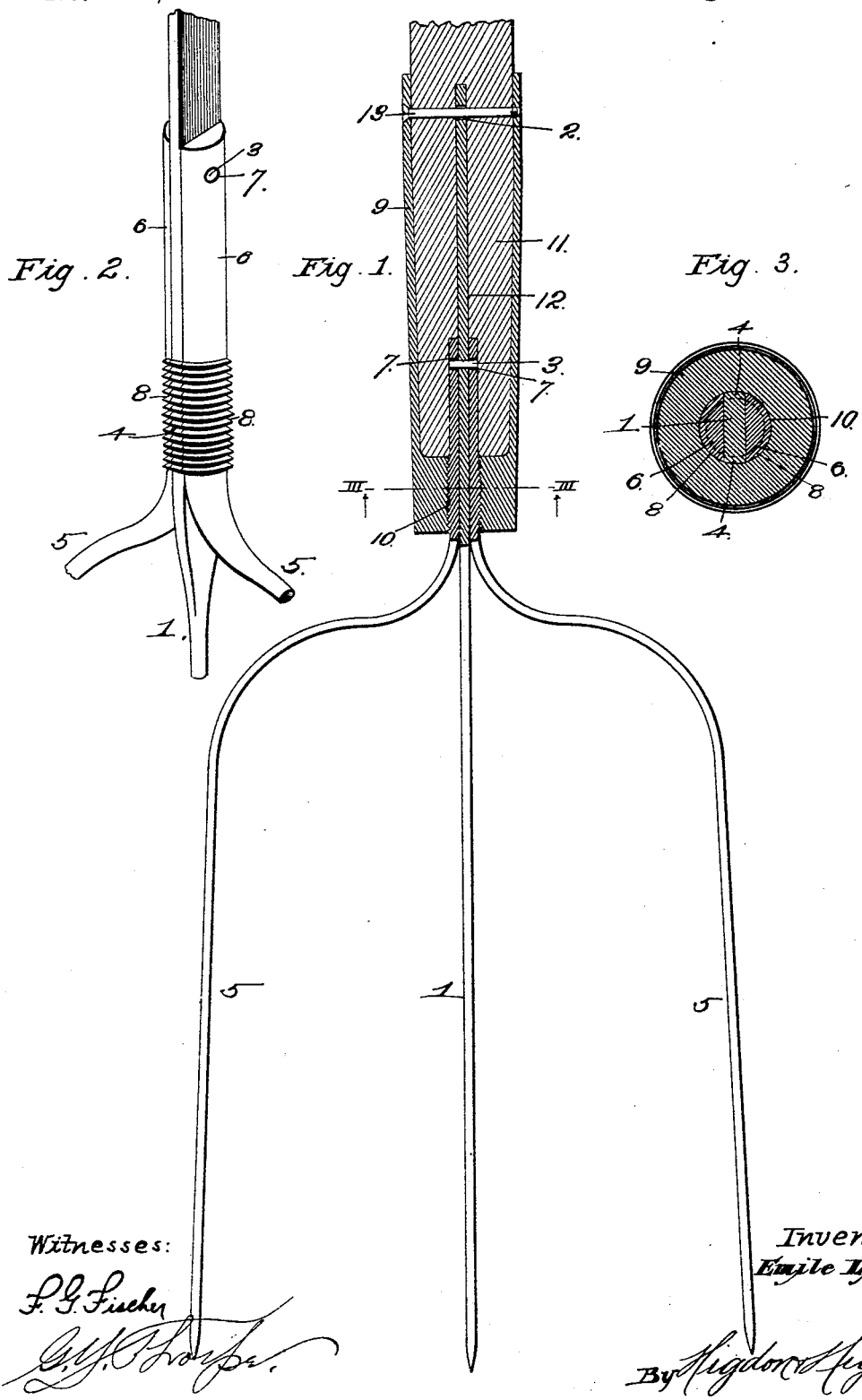

EMILE LIND, OF KANSAS CITY, MISSOURI.

PITCHFORK.

SPECIFICATION forming part of Letters Patent No. 587,980, dated August 10, 1897.

Application filed September 22, 1896. Serial No. 606,612. (No model.)

*To all whom it may concern:*

Be it known that I, EMILE LIND, of Kansas City, Jackson county, Missouri, have invented certain new and useful Improvements in Pitchforks, of which the following is a full, clear, and exact description, reference being had to the accompanying drawings, forming a part thereof.

My invention relates to pitchforks, and my object is to produce a device of this character provided with removable tines which is simple, strong, durable, and inexpensive of construction.

The invention consists in certain novel and peculiar features of construction and combinations of parts, as will be hereinafter described, and pointed out in appended claims.

In order that the invention may be fully understood, I will proceed to describe it with reference to the said accompanying drawings, in which—

Figure 1 represents a view of a pitchfork embodying my invention, partly in section and partly in elevation. Fig. 2 represents a perspective view of the upper portion of the tines or pitchfork proper. Fig. 3 represents a cross-section, on an enlarged scale, taken on the line III III of Fig. 1.

Similar numerals designate corresponding parts in the several figures.

1 designates the middle tine, which is flattened, preferably, for a suitable distance at its upper end, as shown most clearly in Figs. 2 and 3. Near its upper end it is provided with a hole or aperture 2 and some distance below with the laterally-projecting pin or pins 3. Below said pin or pins, preferably at its front and rear edges, it is screw-threaded for a suitable distance, as shown at 4.

5 designates the side or outer tines, and 6 parallel extensions thereon which fit against opposite sides of the extension of the middle tine and are preferably segmental in cross-section, so as to form in conjunction with said middle tine a cylindrical stem, as shown most clearly in Figs. 2 and 3. Near their upper ends they are provided with guide holes or apertures 7, which fit snugly upon the laterally-projecting pin or pins 3, as shown clearly in Figs. 1 and 2, and below said holes or apertures are provided with screw-threaded portions 8 on their grooved surfaces which register with the screw-threaded portions 4 of the tine 1, as shown clearly in Fig. 3. By mounting said extensions of the side tines upon said pin or pins 3 it is obvious that the threaded portions of the several parts are held in their proper relation to each other, so as to form a continuous spiral screw-thread.

9 designates a metallic sleeve or sheath which is formed internally at its lower end or is provided with a nut or collar 10, which engages the threaded shank 6, formed by the tines, as shown clearly in Figs. 1 and 3.

11 designates the ordinary wood handle, which is incased at its lower end tightly by the sleeve or sheath 9 and is bored at its lower end to embrace snugly the non-threaded portion of the shank of said tines and with a registering passage 12, which may or may not fit snugly upon the portion of the tine 1, projecting beyond the end of said shank, and securing the sleeve, the handle, and said upwardly-projecting portion reliably together is a screw-bolt 13 or other removable pin engaging holes or passages in the sleeve and the handle which register with the hole or aperture 2 in the upper end of the tine 1, as shown clearly in Fig. 1.

To assemble the parts of this fork together, it is only necessary to fit the tines together, as already explained, screw the sleeve or sheath down upon them, slip the handle down into the sleeve or sheath, and insert the bolt or pin 13. This can be accomplished in a very few minutes, and a strong, durable, and reliable fork produced, and one which will cost but little more than the pitchforks in general use and which will outlast many of them.

With the ordinary pitchfork it is well known that when a tine becomes broken it can be used effectively for only certain classes of work; but as they are broken so frequently the farmers, as a rule, use them until they are entirely disabled by the breaking of a second tine. A new fork must then be purchased.

With my improved fork it is obvious that in case a tine becomes broken it can be replaced easily and quickly by removing the bolt or pin 13, slipping the handle out of its socket or sheath, and unscrewing the latter from the threaded tines. The broken tine is then removed and a new one of the same size replaces it. The parts are then assembled as before, and the fork is ready for use.

Dealers handling forks of this character or type will also carry in stock tines of various sizes, which will render it unnecessary for the farmer to purchase a new fork whenever his old one is disabled, which consequently makes the use of my improved fork much less expensive than the use of the old kind, which of course will be cheaper at first cost.

The handle and sleeve or sheath will be practically indestructible and may be employed for years.

Another advantage which my improved fork possesses over those of the old style lies in the fact of their knockdown construction, which will facilitate their shipment.

The element of danger encountered in handling bundles of pitchforks will also be removed, as the tines may be boxed up together.

From the above description it will be apparent that I have produced a knockdown pitchfork which possesses the various advantages enumerated in the foregoing description, and it is to be understood that changes may be resorted to which do not involve a departure from the spirit and scope of the invention.

Having thus described the invention, what I claim as new, and desire to secure by Letters Patent, is—

1. A pitchfork, comprising a middle tine having near its upper end an aperture, and some distance below the same a laterally-projecting pin, side tines provided with parallel extensions which fit against opposite sides of the middle tine for a suitable distance and have holes or apertures engaging said laterally-projecting pin, and having a threaded shank below said pin, a sleeve or sheath internally threaded at its lower end and engaging said threaded shank, and a handle fitting in and detachably secured to said sleeve or sheath, substantially as described.

2. A pitchfork, comprising a middle tine, having an upward extension provided near its upper end with an aperture, at its lower end with screw-threads at its edges, and between said threaded portions and said aperture with a laterally-projecting pin, side tines having parallel portions which fit squarely against opposite sides of the extension of the middle tine, and are provided with holes which engage said laterally-projecting pin, and with threaded surfaces which register with the threaded portion of the middle-tine extension, so as to produce a threaded shank, a sleeve or sheath internally threaded at its lower end and engaging said threaded shank and provided with holes at its upper end which register with the hole or aperture in the upper end of the middle-tine extension, a handle fitting snugly in said sleeve or sheath and upon the cylindrical shank and upward extension of the middle tine, and provided with passages which register with the hole in the upper end of said extension and with the holes in the sleeve or sheath, and a removable pin engaging said registering holes or apertures, substantially as described.

In testimony whereof I affix my signature in presence of two witnesses.

EMILE LIND.

Witnesses:
G. Y. THORPE,
M. R. REMLEY.